(12) United States Patent
Kimura et al.

(10) Patent No.: US 11,392,092 B2
(45) Date of Patent: Jul. 19, 2022

(54) INFORMATION PROCESSING DEVICE AND INFORMATION PROCESSING METHOD

(71) Applicant: Sony Corporation, Tokyo (JP)

(72) Inventors: Tomoya Kimura, Chiba (JP); Akira Fukui, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 129 days.

(21) Appl. No.: 16/971,686

(22) PCT Filed: Dec. 5, 2018

(86) PCT No.: PCT/JP2018/044742
§ 371 (c)(1),
(2) Date: Aug. 21, 2020

(87) PCT Pub. No.: WO2019/167374
PCT Pub. Date: Sep. 6, 2019

(65) Prior Publication Data
US 2020/0409317 A1    Dec. 31, 2020

(30) Foreign Application Priority Data
Feb. 28, 2018   (JP) .............................. JP2018-035014

(51) Int. Cl.
G05B 11/42      (2006.01)
G05B 13/04      (2006.01)
G05B 17/02      (2006.01)

(52) U.S. Cl.
CPC ............ *G05B 11/42* (2013.01); *G05B 13/042* (2013.01); *G05B 17/02* (2013.01)

(58) Field of Classification Search
USPC ......................................................... 700/42
See application file for complete search history.

(56) References Cited

U.S. PATENT DOCUMENTS

2004/0245378 A1   12/2004   Nonami
2011/0288833 A1   11/2011   Osogami
(Continued)

FOREIGN PATENT DOCUMENTS

CN   101930216 A   12/2010
CN   102736628 A   10/2012
(Continued)

OTHER PUBLICATIONS

International Search Report and Written Opinion dated Feb. 26, 2019 for PCT/JP2018/044742 filed on Dec. 5, 2018, 9 pages including English Translation of the International Search Report.
(Continued)

*Primary Examiner* — Jigneshkumar C Patel
(74) *Attorney, Agent, or Firm* — Xsensus LLP

(57) ABSTRACT

[Problem] To more easily and effectively absorb a difference in motion characteristic between a simulator model and a real robot.
[Solution] Provided is an information processing device including a communication unit that receives a movement result of an autonomous moving body based on a control command value, and a parameter approximation unit that approximates a motion characteristic parameter of a simulator model for a movement simulation of the autonomous moving body on the basis of a movement result of the autonomous moving body, in which the parameter approximation unit approximates the motion characteristic parameter on the basis of similarity between a plurality of simulation results acquired on the basis of the different motion characteristic parameters in the movement simulation based on the control command value, and the movement result of the autonomous moving body.

17 Claims, 13 Drawing Sheets

(56) References Cited

U.S. PATENT DOCUMENTS

2012/0123615 A1* 5/2012 Bourzier ................ F42B 15/01
701/3
2019/0094831 A1* 3/2019 Nakano ................ G05B 19/41

FOREIGN PATENT DOCUMENTS

| CN | 103038714 A | 4/2013 |
|----|---|---|
| CN | 103885820 A | 6/2014 |
| CN | 105929860 A | 9/2016 |
| CN | 106599342 A | 4/2017 |
| CN | 107610579 A | 1/2018 |
| JP | 63-055603 A | 3/1988 |
| JP | 2001-350503 A | 12/2001 |
| JP | 2004-188541 A | 7/2004 |
| JP | 2006-107256 A | 4/2006 |
| JP | 2006-236226 A | 9/2006 |
| JP | 2006-302078 A | 11/2006 |
| JP | 2008-102714 A | 5/2008 |
| JP | 2008102714 A * | 5/2008 |

OTHER PUBLICATIONS

Christiano, P., et al., "Transfer from Simulation to Real World through Learning Deep Inverse Dynamics Model," Oct. 11, 2016, 8 pages.
Susumu Tarao et al: "Motion simulator for a multi-degree-of-freedom magnetically levitated robot", System Integration (Sli), 2011 IEEE/SICE International Symposium On, IEEE, Dec. 20, 2011 (Dec. 20, 2011), pp. 869-874, XP032112797, DOI: 10.1109/SII.2011.6147563 ISBN: 978-1-4577-1523-5.

* cited by examiner

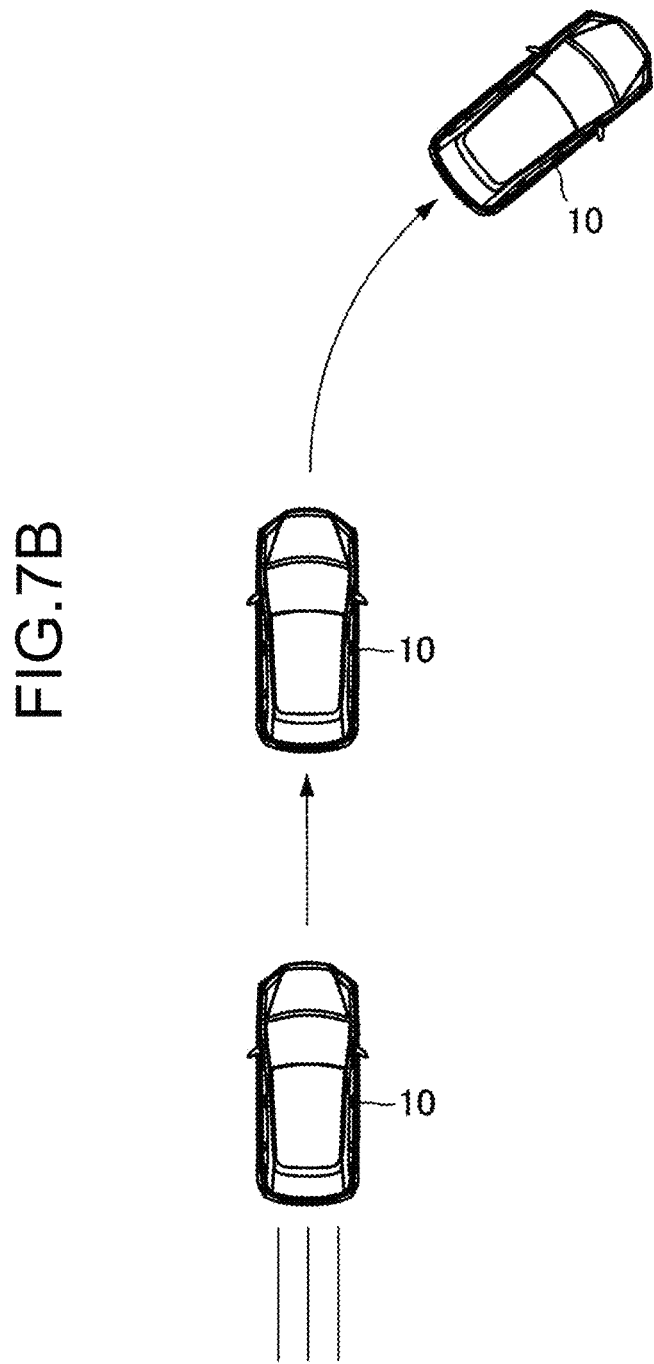

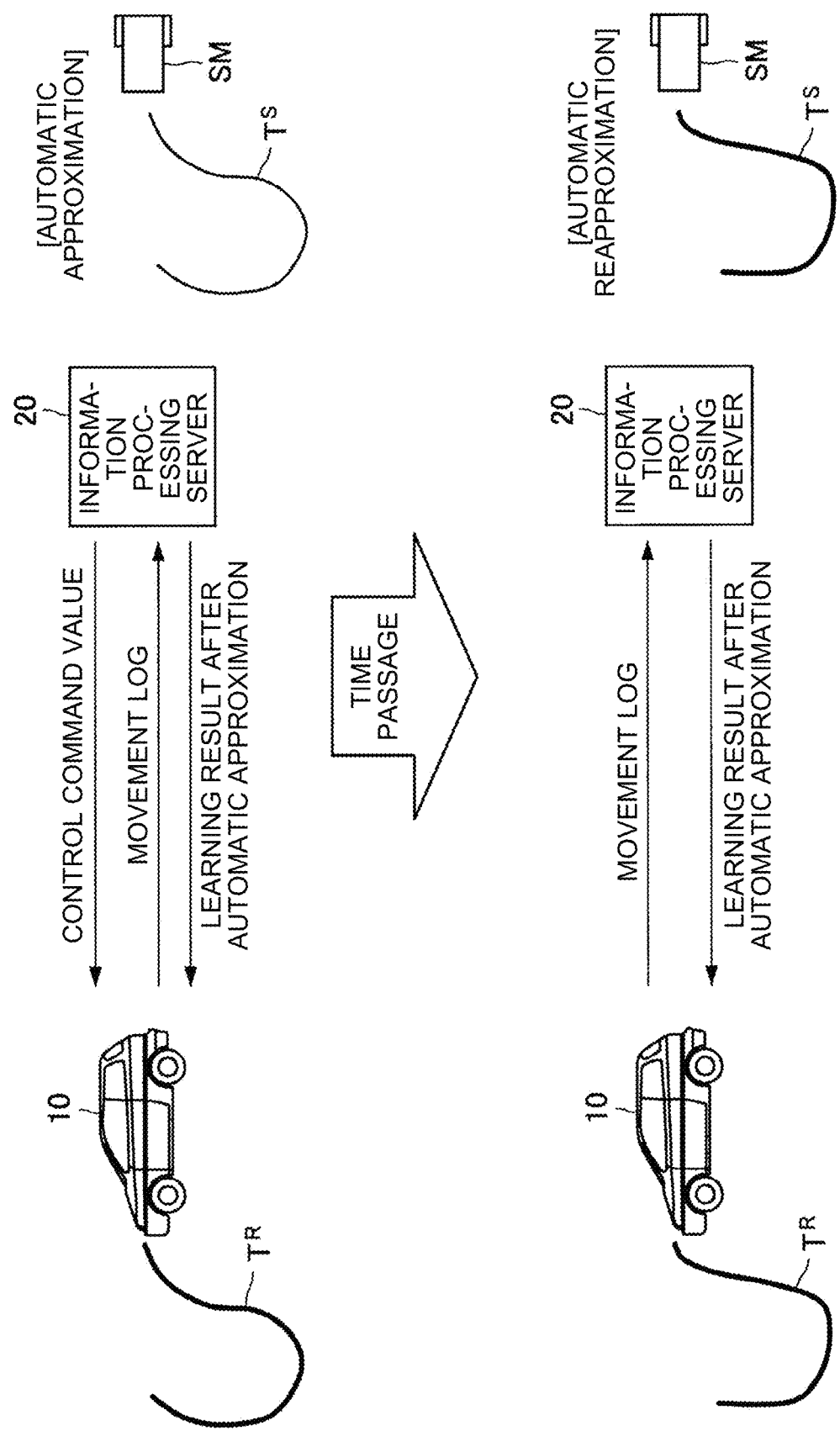

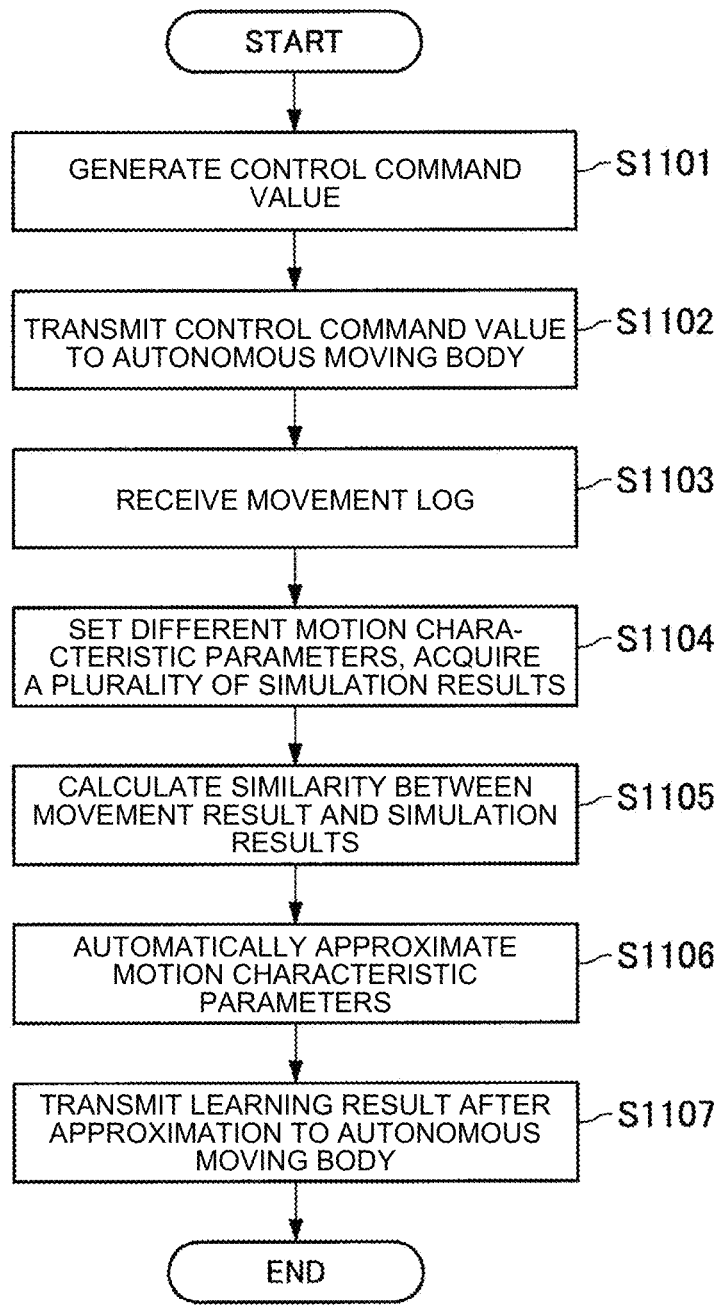

INFORMATION PROCESSING DEVICE AND INFORMATION PROCESSING METHOD

CROSS-REFERENCE TO RELATED APPLICATIONS

The present application is based on PCT filing PCT/JP2018/044742, filed Dec. 5, 2018, which claims priority to JP 2018-035014, filed Feb. 28, 2018, the entire contents of each are incorporated herein by reference.

FIELD

The present disclosure relates to an information processing device and an information processing method.

BACKGROUND

In recent years, technology for applying a learning result of a model on a simulator to a real robot has been studied. Further, technology for absorbing a difference in motion characteristic between a model and a real robot as described above has also been proposed. For example, Non Patent Literature 1 discloses technology for converting a control command value by using a deep neural network in order to cause a real robot to execute the same movement as movement of a model on a simulator.

CITATION LIST

Non Patent Literature

Non Patent Literature 1: Wojciech Zaremba and seven others, "Transfer from Simulation to Real World through Learning Deep Inverse Dynamics Model", Oct. 11, 2016, [Online], [Feb. 26, 2018 search], Internet <https://arxiv.org/abs/1610.03518>

SUMMARY

Technical Problem

However, in the technology disclosed in Non Patent Literature 1, training based on a large amount of movement data of a real robot is required. Further, a calculation cost tends to increase with the technology, because the control command value is converted by the deep neural network each time.

Therefore, the present disclosure proposes a novel and improved information processing device and information processing method which can more easily and effectively absorb a difference in motion characteristic between a simulator model and a real robot.

Solution to Problem

According to the present disclosure, an information processing device is provided that includes: a communication unit that receives a movement result of an autonomous moving body based on a control command value; and a parameter approximation unit that approximates a motion characteristic parameter of a simulator model for a movement simulation of the autonomous moving body on a basis of the movement result of the autonomous moving body, wherein the parameter approximation unit approximates the motion characteristic parameter on a basis of similarity between a plurality of simulation results acquired on a basis of the different motion characteristic parameters in the movement simulation based on the control command value, and the movement result of the autonomous moving body.

Moreover, according to the present disclosure, an information processing method is provided that includes, by a processor: receiving a movement result of an autonomous moving body based on a control command value; and approximating a motion characteristic parameter of a simulator model for a movement simulation of the autonomous moving body on a basis of the movement result of the autonomous moving body, wherein the approximating further includes approximating the motion characteristic parameter on a basis of similarity between a plurality of simulation results acquired on a basis of the different motion characteristic parameters in the movement simulation based on the control command value, and the movement result of the autonomous moving body.

Advantageous Effects of Invention

As described above, according to the present disclosure, it is possible to more easily and effectively absorb a difference in motion characteristic between a simulator model and a real robot.

Note that the effect described above is not necessarily limitative, and with or in the place of the above effect, there may be achieved any one of the effects described in this specification or other effects that may be grasped from this specification.

BRIEF DESCRIPTION OF DRAWINGS

FIG. 7B is a diagram for describing movement according to the embodiment, in which a difference in motion characteristic is likely to appear.

FIG. 8 is a diagram for describing reapproximation of motion characteristic parameters according to the embodiment.

FIG. 9 is a flowchart illustrating a flow of automatic approximation according to the embodiment.

DESCRIPTION OF EMBODIMENTS

Figure 1:
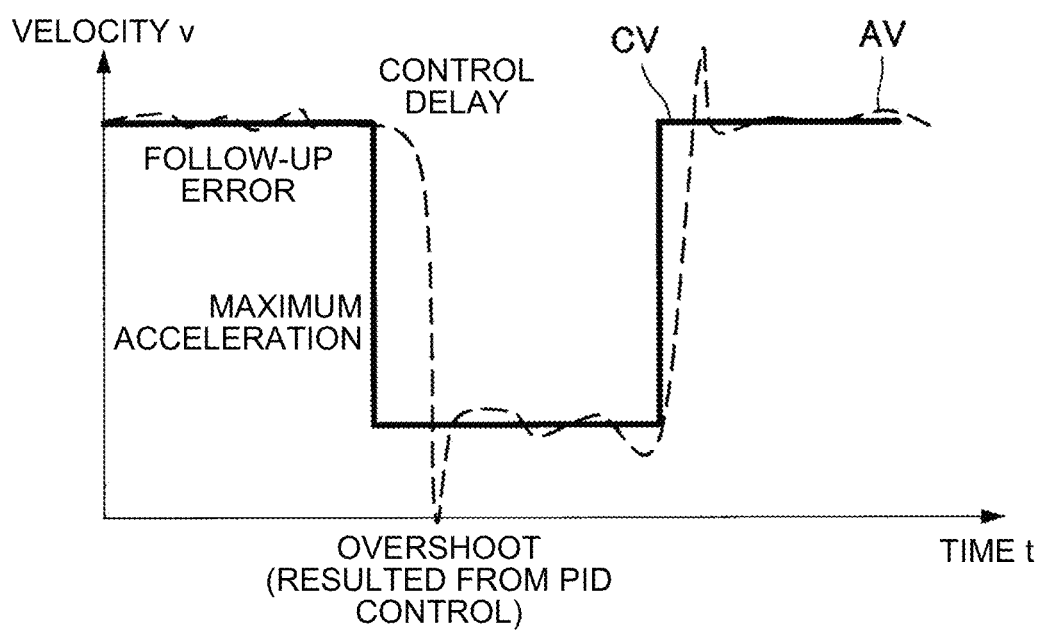
FIG. 1 is a diagram for describing deviation of control velocity resulted from a motion characteristic according to an embodiment of the present disclosure.

A preferred embodiment of the present disclosure will be described below in detail with reference to the accompanying drawings. Note that, in this specification and the drawings, components having substantially the same functional configuration are provided with the same reference signs, so that repeated description of these components is omitted.

Note that the description will be made in the following order.

1. Embodiment
1.1. Overview
1.2. System configuration example
1.3. Functional configuration example of autonomous moving body 10 and information processing server 20
1.4. Details of automatic approximation
1.5. Automatic reapproximation of motion characteristic parameters
1.6. Flow of movement
1.7. Effect
2. Hardware configuration example
3. Summary 1. Embodiment <<1.1. Overview>>

First, an overview of an embodiment of the present disclosure will be described. As described above, in recent years, technology for applying a learning result of a model on a simulator to a real robot has been studied. With the above method, by reproducing various kinds of environments on the simulator, for example, it is possible to efficiently collect a large amount of movement data that is difficult to collect in the real world, and to achieve effective learning.

Meanwhile, when trying to apply a learning result on the simulator to the real robot, it is important to consider a difference in motion characteristic between the model on the simulator and the real robot. Here, motion characteristics refer to various kinds of factors that cause individual differences in movement by the real robot or a simulator model. The motion characteristics may include, for example, maximum velocity, maximum acceleration, a follow-up state to constant velocity, a friction coefficient, or the like.

Usually, because each real robot has a different motion characteristic, different movement is performed according to an individual motion characteristic even in a case where the same control command value is given. Therefore, in a case where the simulator model and the real robot have different motion characteristics, movement different from expected movement is executed even if the learning result on the simulator is applied to the real robot as is.

FIG. 1 is a diagram for describing deviation of control velocity resulted from a motion characteristic. FIG. 1 illustrates an example of actual velocity AV of the real robot with respect to target velocity CV given as a control command value. In an example illustrated in FIG. 1, it is shown that, due to a motion characteristic of the real robot has, a follow-up error, a control delay, an overshoot resulted from PID control, and the like has occurred, causing large deviation between the target velocity CV and the actual velocity AV.

Figure 2:
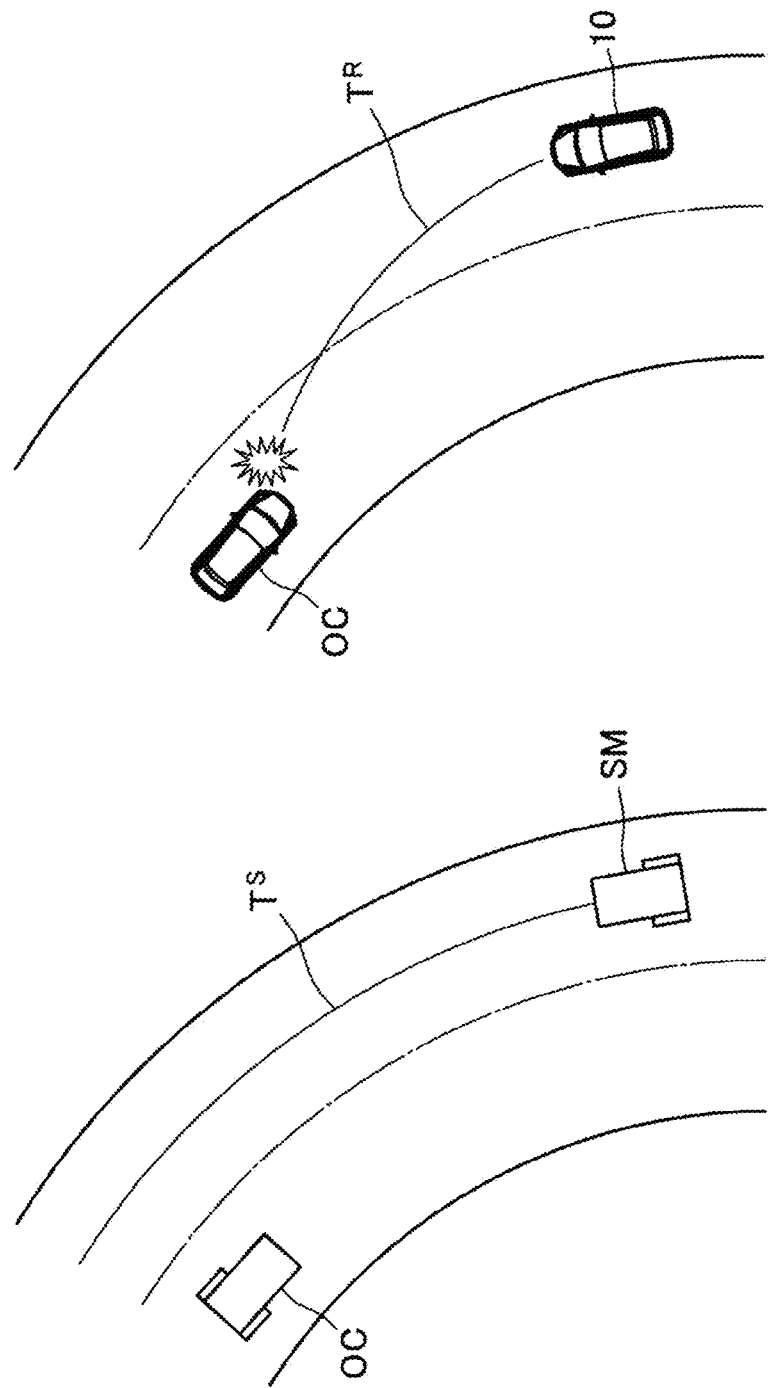
FIG. 2 is a diagram for describing trajectory deviation resulted from a motion characteristic according to the embodiment.

Further, FIG. 2 is a diagram for describing trajectory deviation resulted from a motion characteristic. On a left side of FIG. 2, a trajectory $T^S$ of a simulator model SM with respect to a predetermined control command value is illustrated, and a situation where the simulator model SM is moving in an own lane on the basis of the control command value without colliding with an oncoming car OC is illustrated.

Meanwhile, a right side of FIG. 2 illustrates a trajectory $T^R$ of the real robot (autonomous moving body 10) with respect to the same control command value. An example illustrated in FIG. 2 illustrates a situation where, because motion characteristics (for example, a friction coefficient of tires, or the like) of the simulator model SM and the autonomous moving body 10 are different from each other, the autonomous moving body 10 moves differently from the simulator model SM and collides with an oncoming car OC in a case where the same control command value is given.

Thus, in a case where the motion characteristics of a simulator model and a real robot are different from each other, large deviation is caused in movement with respect to the same control command value, and accuracy and safety may be impaired by the real robot moving differently from expected.

In order to avoid the above-described situation, for example, it is possible to design a simulator model according to a motion characteristic of a real robot, in which case, however, a simulator model corresponding to each real robot is created, resulting in an increase in cost.

Meanwhile, in recent years, technology for applying a learning result concerning a single simulation model to a plurality of real robots has been proposed. For example, Non Patent Literature 1 discloses technology for converting a control command value by using a deep neural network in order to cause a real robot to execute the same movement as movement of a simulator model.

With the technology described in Non Patent Literature 1, by converting a control command value and giving the command value to a real robot each time so that the same movement (for example, velocity or angular velocity) as movement of a simulator model is performed, a difference in motion characteristic between the simulator model and the real robot can be absorbed, and a learning result concerning a single simulator model can be applied to a plurality of real robots.

However, in the technology described in Non Patent Literature 1, it is required to collect a large amount of movement data of a real robot and conduct training in order to achieve the above-described control. Further, in the technology described in Non Patent Literature 1, a calculation cost tends to increase, because it is required to convert a control command value by using the deep neural network each time.

A technical idea according to an embodiment of the present disclosure is conceived by focusing on the above-described points, and it is possible to more easily and effectively absorb a difference in motion characteristic between the simulator model and the real robot. For this reason, an information processing server 20 according to an embodiment of the present disclosure approximates a motion characteristic parameter of the simulator model for a movement simulation of the autonomous moving body 10 on the basis of a movement result of the real robot (autonomous moving body 10) based on the control command value. At this time, one feature of the information processing server 20 according to an embodiment of the present disclosure is to approximate motion characteristic parameters, on the basis of similarity between a plurality of simulation results acquired in a movement simulation based on the same control command value on the basis of different motion characteristic parameters, and a movement result of the autonomous moving body 10.

Figure 3:
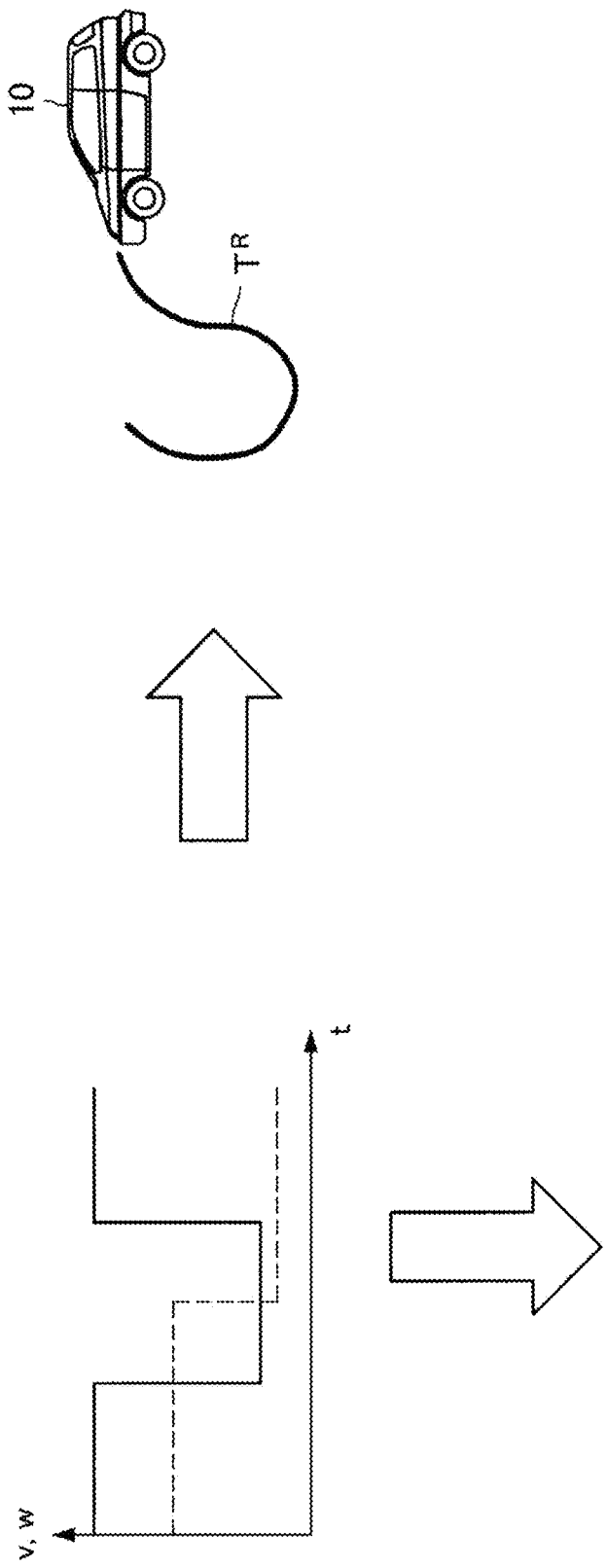
FIG. 3 is a diagram for describing approximation of motion characteristic parameters according to the embodiment.

FIG. 3 is a diagram for describing approximation of motion characteristic parameters according to the present embodiment. First, the information processing server 20 according to the present embodiment generates a control command value for causing the autonomous moving body 10 to perform a predetermined movement in a certain environment. In a case of an example illustrated in FIG. 3, the information processing server 20 generates a control command value for causing the autonomous moving body 10 to move at a predetermined velocity and angular velocity. Note that, in the graph in FIG. 3, a velocity command value and an angular velocity command value are illustrated by a solid line and a dotted line, respectively.

Next, the information processing server 20 transmits the generated control command value to the autonomous moving body 10, causes the autonomous moving body 10 to execute movement with respect to the control command value, and acquires a movement result. In the example illustrated in FIG. 3, the information processing server 20 acquires a trajectory $T_R$ of the autonomous moving body 10 as the movement result.

Further, the information processing server 20 sets different sets of motion characteristic parameters for the same control command value as the control command value transmitted to the autonomous moving body 10 and the same environment, and acquires a plurality of simulation results. In the case of the example illustrated in FIG. 3, the information processing server 20 sets a set of parameters with different values of PID control parameters $K_p$, Ki, and $K_d$, and wheel friction parameter μ, causes a simulator model SM to execute movement, and acquires three different trajectories $T^{S1}$, $T^{S2}$, and $T^{S3}$. At this time, the information processing server 20 may set the motion characteristic parameter by using a search method such as a random search, a grid search, genetic algorithm, or a hill climbing search, for example.

Next, the information processing server 20 calculates similarity between each of the plurality of acquired simulation results and the movement result of the autonomous moving body 10, and approximates motion characteristic parameters on the basis of a simulation result with a highest degree of similarity.

In the case of the example illustrated in FIG. 3, on the basis of the trajectory $T^{S3}$ of the simulator model SM that is most similar to the trajectory $T^R$ of the autonomous moving body 10, the information processing server 20 can identify a motion characteristic parameter set in the simulation and can approximate the motion characteristic parameter of the simulator model SM.

Thus, with the information processing server 20 according to the present embodiment, by comparing the movement result of the autonomous moving body 10 and the simulation results with respect to the same control command value, the motion characteristic parameters for both can be efficiently and automatically approximated. With the above-described function of the information processing server 20 according to the present embodiment, on the basis of a small amount of movement data, in short time, the motion characteristic parameters can be automatically approximated without human intervention, and the learning result on the simulator can be easily applied to the autonomous moving body 10. Further, with automatic approximation according to the present embodiment, it is possible to significantly reduce a calculation cost, because it is not necessary to convert a control command value each time as in the technology described in Non Patent Literature 1.

<<1.2. System Configuration Example>>

Figure 4:
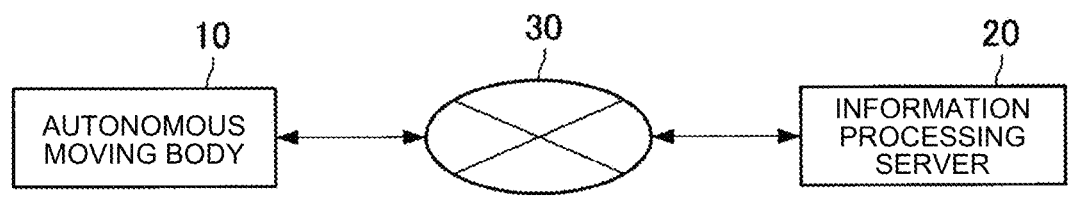
FIG. 4 is a block diagram illustrating a configuration example of an information processing system according to the embodiment.

Next, a configuration example of an information processing system according to an embodiment of the present disclosure will be described. FIG. 4 is a block diagram illustrating a configuration example of an information processing system according to the present embodiment. With reference to FIG. 4, the information processing system according to the present embodiment includes the autonomous moving body 10 and the information processing server 20. Further, to enable mutual communication, the autonomous moving body 10 and the information processing server 20 are connected via a network 30.

(Autonomous Moving Body 10)

The autonomous moving body 10 according to the present embodiment is various kinds of robots that performs movement on the basis of a learning result on a simulator and a given control command value. The autonomous moving body 10 according to the present embodiment may be, for example, a mobile robot such as an automobile, an aircraft, a drone, a ship, a submarine, or a flapping robot, and may be an arm-type robot that includes an electromagnetic motor drive arm, an air pressure drive arm, or the like. Further, the autonomous moving body 10 according to the present embodiment may be an exoskeleton suit utilizing artificial muscle that uses an air pressure actuator, or the like.

(Information Processing Server 20)

The information processing server 20 according to the present embodiment is an information processing device having a function to approximate motion characteristics of the autonomous moving body 10 and the simulator model. The information processing server 20 according to the present embodiment may be a simulator having a function to generate a control command value and a simulation function based on the control command value. Details of functions of the information processing server 20 according to the present embodiment will be separately described later.

(Network 30)

The network 30 has a function to connect the autonomous moving body 10 and the information processing server 20. The network 30 may include a public line network such as the Internet, a telephone line network, or a satellite communication network, various local area networks (LANs) or wide area networks (WANs), which include Ethernet (registered trademark), or the like. Further, the network 30 may include a dedicated line network such as an Internet protocol-virtual private network (IP-VPN). Further, the network 30 may include a wireless communication network such as Wi-Fi (registered trademark) or Bluetooth (registered trademark).

A configuration example of an information processing system according to an embodiment of the present disclosure has been described above. Note that the functional configuration illustrated above with reference to FIG. 4 is merely an example, and a functional configuration of the information processing system according to the present embodiment is not limited to this example. The functional configuration of the information processing system according to the present embodiment can be flexibly modified according to a specification or operation.

<<1.3. Functional Configuration Example of Autonomous Moving Body 10 and Information Processing Server 20>>

Figure 5:
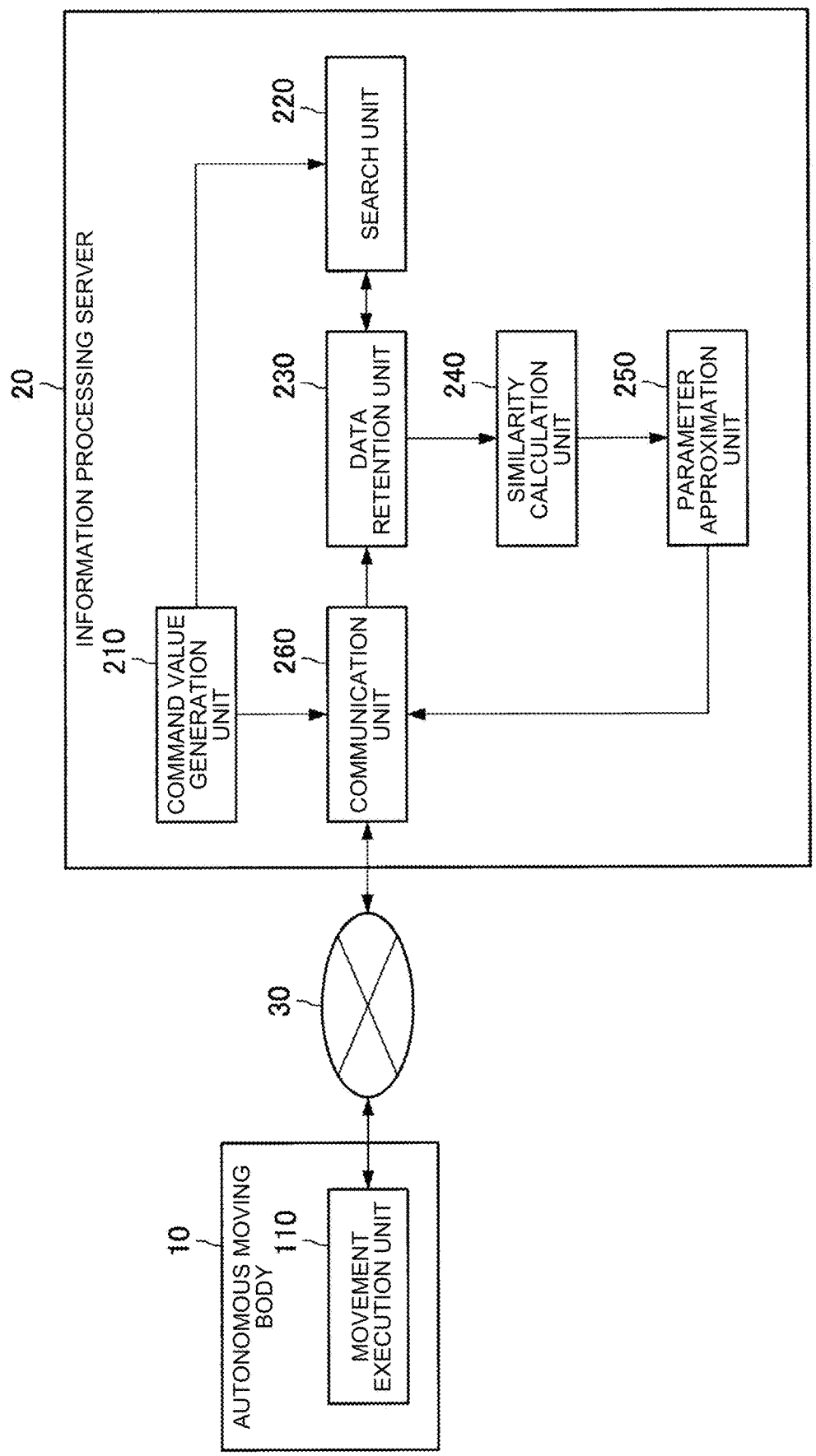
FIG. 5 is a block diagram illustrating a functional configuration example of an autonomous moving body and an information processing server according to the embodiment.

Next, a functional configuration example of the autonomous moving body 10 and the information processing server 20 according to an embodiment of the present disclosure will be described. FIG. 5 is a block diagram illustrating a functional configuration example of the autonomous moving body 10 and the information processing server 20 according to the present embodiment. With reference to FIG. 5, the autonomous moving body 10 according to the present embodiment includes a movement execution unit 110. Further, the information processing server 20 according to the present embodiment includes a command value generation unit 210, a search unit 220, a data retention unit 230, a similarity calculation unit 240, a parameter approximation unit 250, and a communication unit 260.

(Movement Execution Unit 110)

The movement execution unit 110 according to the present embodiment has a function to execute various kinds of movement on the basis of a control command value and a learning result on the simulator, which are transmitted from the information processing server 20. The movement execution unit 110 controls movement of a drive unit that includes a motor, an actuator, or the like, on the basis of the above-described control command value and learning result, for example. A configuration of the movement execution unit 110 may be designed as appropriate according to a characteristic of the autonomous moving body 10.

(Command Value Generation Unit 210)

The command value generation unit 210 according to the present embodiment generates a control command value for causing the autonomous moving body 10 and a simulator model to move. The command value generation unit 210 may generate, for example, a control command value for movement involving a target velocity change or a target angular velocity change. The command value generation unit 210 generates a control command value including, for example, a target velocity/target angle sequence $[(v_0, w_0), (v_1, w_1) \ldots (v_r, w_r)]$, and passes the target velocity/target angle sequence to the communication unit 260 and the search unit 220. The command value generation unit 210 can transmit the generated control command value to the autonomous moving body 10 via the communication unit 260, and control execution of the movement corresponding to the control command value. With such a function, it is possible to achieve automatic approximation of motion characteristic parameters for the autonomous moving body 10 and the simulator model without human intervention.

(Search Unit 220)

The search unit 220 according to the present embodiment has a function to install different sets of motion characteristic parameters on the basis of the control command value generated by the command value generation unit 210 and acquires a plurality of simulation results. At this time, the search unit 220 may acquire a plurality of simulation results based on different motion characteristic parameters by using a search method such as a random search, a grid search, genetic algorithm, or a hill climbing search, for example.

Further, the search unit 220 links and passes, to the data retention unit 230, the set motion characteristic parameters and the simulation results. Note that a motion characteristic parameter according to the present embodiment includes various kinds of parameters for automatic control of the autonomous moving body 10. The above-described automatic control includes various kinds of follow-up control and constant value control. Examples of a motion characteristic parameter according to the present embodiment include a PID control parameter and a friction parameter as illustrated in FIG. 3. Further, examples of a simulation result include a trajectory $T^S$ with respect to a control command value for t seconds. Further, the simulation result may be, in addition to a trajectory, gyro transition for t seconds, a relative position or relative pose after t seconds, velocity transition or angular velocity transition for t seconds, rotation angle transition of tires or a motor for t seconds, or the like.

(Data Retention Unit 230)

The data retention unit 230 according to the present embodiment retains the motion characteristic parameters and the simulation results passed from the search unit 220, and information concerning a movement result or movement environment of the autonomous moving body 10, the information being received by the communication unit 260. Here, the above-described movement result may be a movement result of the autonomous moving body 10 with respect to the control command value generated by the command value generation unit 210 and transmitted to the autonomous moving body 10 by the communication unit 260, and the movement result may be, for example, various kinds of information corresponding to the above-described various kinds of simulation results, such as a trajectory $T^R$ of the autonomous moving body 10 as illustrated in FIG. 3. Further examples of the movement environment include environments such as floor friction, wind, and water flow.

(Similarity Calculation Unit 240)

The similarity calculation unit 240 according to the present embodiment calculates similarity between the movement result of the autonomous moving body 10 and the simulation result, which are retained by the data retention unit 230. The similarity calculation unit 240 calculates similarity between the movement result of the autonomous moving body 10 and each simulation result on the basis of, for example, calculation, such as |trajectory $T^R$−trajectory $T^S$|, or the like, and passes a value and the similarity of the motion characteristic parameter of each simulation result to the parameter approximation unit 250. Note that a target of similarity calculation by the similarity calculation unit 240 is not limited to a trajectory, and may be the above-described relative position/pose, velocity/angular velocity transition, a rotation angle of tires, or the like.

(Parameter Approximation Unit 250)

The parameter approximation unit 250 according to the present embodiment has a function to approximate motion characteristic parameters on the basis of the similarity between the movement result of the autonomous moving body 10 and each simulation result, which is calculated by the similarity calculation unit 240. More specifically, the parameter approximation unit 250 may adopt, for parameter approximation, a motion characteristic parameter for a simulation result having a highest similarity, among each of the simulation results, to the movement result of the autonomous moving body 10. With the above-described function that the parameter approximation unit 250 according to the present embodiment has, it is possible to automatically generate a simulator model that has a motion characteristic close to a motion characteristic of the autonomous moving body 10, and to apply the learning result by the simulator model to the autonomous moving body 10 as is.

(Communication Unit 260)

The communication unit 260 according to the present embodiment performs information communication with the autonomous moving body 10 via the network 30. Specifically, the communication unit 260 transmits the control command value generated by the command value generation unit 210 to the autonomous moving body. Further, from the autonomous moving body 10, the communication unit 260 receives the movement result of the autonomous moving body 10 based on the above-described control command value or information concerning movement environment.

A functional configuration example of the autonomous moving body 10 and the information processing server 20 according to an embodiment of the present disclosure has been described above. Note that the functional configuration described above with reference to FIG. 5 is merely an example, and a functional configuration of the autonomous moving body 10 and the information processing server 20 according to the present embodiment is not limited to this example. For example, the above-described simulator function or learning function may be achieved by a device separate from the information processing server 20. The functional configuration of the autonomous moving body 10 and information processing server 20 according to the present embodiment can be flexibly modified according to a specification or operation.

<<1.4. Details of Automatic Approximation>>

Next, automatic approximation of motion characteristic parameters by the information processing server 20 according to the present embodiment will be described in more detail. As described above, the information processing server 20 according to the present embodiment has a function to automatically approximate motion characteristic parameters for the autonomous moving body 10 and the simulator model.

Further, the autonomous moving body 10 according to the present embodiment may be various kinds of robots including a mobile robot such as an automobile, an aircraft, a drone, a ship, or a submarine, an arm-type robot that includes an electromagnetic motor drive arm, an air pressure drive arm, or the like, an exoskeleton suit, or the like.

Figure 6:
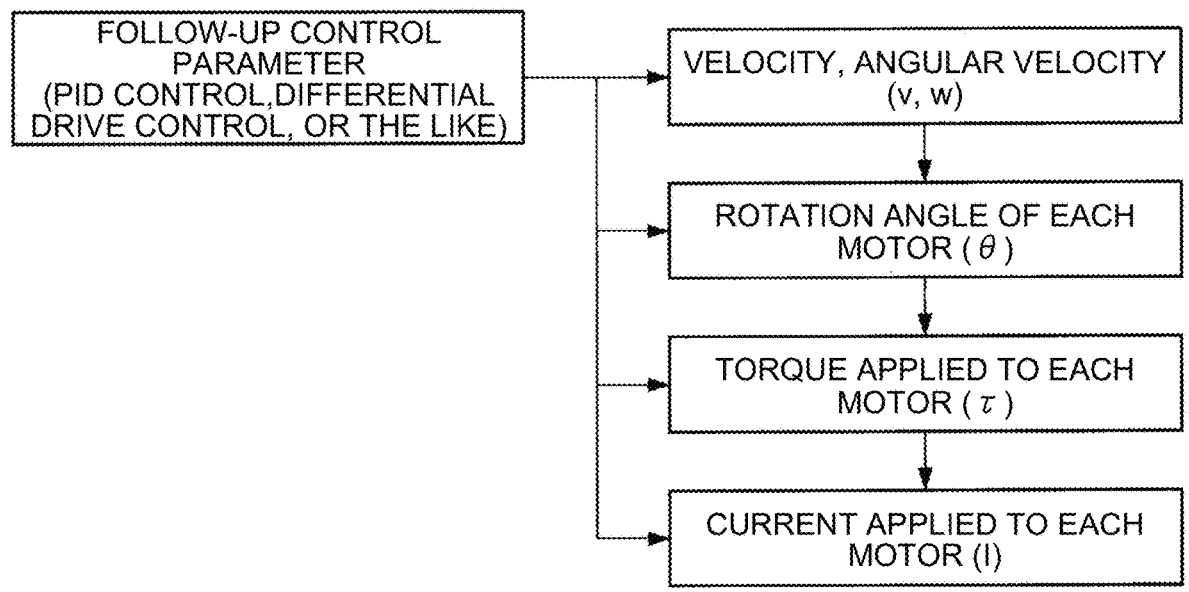
FIG. 6 is a diagram for describing an example of a motion characteristic parameter according to the embodiment.

Therefore, a motion characteristic parameter to be a target of approximation by the information processing server 20 may be designed as appropriate according to a type or characteristic of the autonomous moving body 10. FIG. 6 is a diagram for describing an example of a motion characteristic parameter according to the present embodiment.

FIG. 6 illustrates an example of the motion characteristics according to the present embodiment in a hierarchical structure. As described above, a motion characteristic parameter according to the present embodiment includes various kinds of parameters for automatic control (follow-up control or constant value control) of the autonomous moving body 10. Examples of a follow-up control parameter include a feedback control parameter such as a PID control parameter as illustrated or a differential drive (differential drive) control parameter, and a feedforward control parameter. Further, examples of a factor to be a target of follow-up include, as illustrated, velocity (v) and angular velocity (w), a rotation angle of a motor ($\theta$), torque applied to the motor ($\tau$), and current applied to the motor (I).

At this time, follow-up control may be performed on any tier in FIG. 6. For example, PID control in which target measurement velocity or target angular velocity is a target of follow-up may be performed, or PID control in which torque is a target of follow-up may be performed. The information processing server 20 according to the present embodiment can adapt a motion characteristic regardless of a target of follow-up control.

Note that the motion characteristic parameter according to the present embodiment is not limited to an example illustrated in FIG. 6, and may include various kinds of factors depending on a type or characteristic of the autonomous moving body 10, such as, for example, a control delay parameter, maximum acceleration, maximum angular velocity, wheel friction, a minimum turning radius, or a coefficient of drag (for example, resistance in air or water) caused by a shape or surface material of own.

Next, a specific example of the control command value according to the present embodiment will be described. As described above, the information processing server 20 according to the present embodiment can approximate motion characteristic parameters on the basis of a movement result of the autonomous moving body 10 and a simulation result based on the same control command value. For this reason, the control command value according to the present embodiment may be a command for movement in which a difference in motion characteristic between the autonomous moving body 10 and the simulator model clearly appears.

Figure 7A:
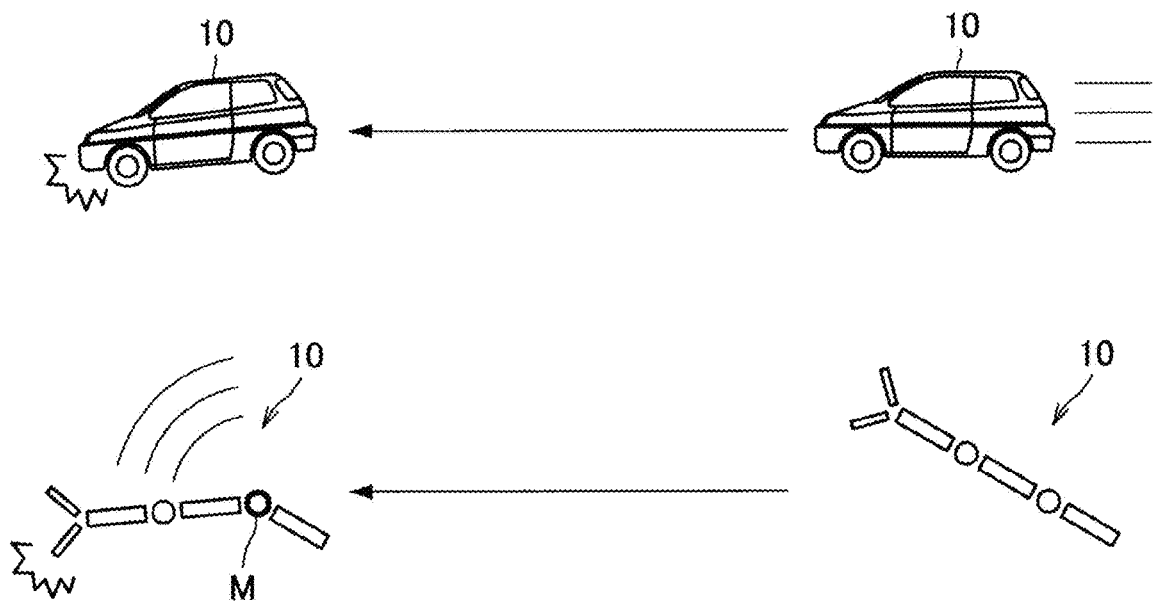
FIG. 7A is a diagram for describing movement according to the embodiment, in which a difference in motion characteristic is likely to appear.

FIGS. 7A and 7B are diagrams for describing movement in which a difference in motion characteristic is likely to appear. An upper part of FIG. 7A illustrates an example of a situation where the autonomous moving body 10, which is an automobile, is suddenly decelerated. Thus, in a case where the autonomous moving body 10, which is an automobile, performs movement involving sudden deceleration, a delay in follow-up with respect to a rapid velocity change is likely to occur, and a phenomenon in which a body of the autonomous moving body 10 subjected to strong inertial force slides forward, or the like, is likely to occur.

Further, a lower part of FIG. 7A illustrates a situation where the autonomous moving body 10, which is an arm-type robot, is suddenly decelerated. Thus, in a case where the autonomous moving body 10, which is an arm-type robot, performs movement involving sudden deceleration, the above-described delay in follow-up or movement deviation due to heavy load applied to a motor M is likely to occur.

Further, FIG. 7B illustrates a situation where the autonomous moving body 10, which is an automobile, makes a sharp turn. In this case, similarly, a delay in follow-up with respect to a rapid angular velocity change or a sideslip due to inertial force, or the like, is likely to occur.

Therefore, the information processing server 20 according to the present embodiment can cause the autonomous moving body 10 and the simulator model to execute movement in which a difference in motion characteristic between the autonomous moving body 10 and the simulator model is likely to occur and can approximate motion characteristics effectively, by adopting a control command value for movement involving a velocity change or angular velocity change, such as sudden deceleration or a sharp turn.

Further, the information processing server 20 according to the present embodiment can generate a control command value in consideration of a plurality of combinations of control factors. For example, in a case where velocity (v) and angular velocity (w) are present as control factors, the command value generation unit 210 may generate a control command value with varied combinations of v, w, $\Delta$v, and $\Delta$w. Here, the above-described $\Delta$v and $\Delta$w indicate an amount of change of v and w, respectively.

Specifically, it is expected that behavior of the autonomous moving body 10 differs depending on whether the autonomous moving body 10 makes a sharp turn (large $\Delta$w) during low speed movement (small v) or makes a sharp turn (large $\Delta$w) during high speed movement (large v). Therefore, by the command value generation unit 210 according to the present embodiment generating a control command value in consideration of a combination of control factors as described above, it is possible to cause the autonomous moving body 10 and the simulator model to execute movement in which a difference in motion characteristic is likely to appear, and effectively approximate motion characteristic parameters.

A control command value and a motion characteristic parameter according to the present embodiment have been described above with reference to specific examples. The information processing server 20 according to the present embodiment can automatically approximate various kinds of motion characteristic parameters by causing the autonomous moving body 10 and the simulator model to execute movement based on the same control command value generated as described above.

Note that, although the case where a motion characteristic of movement of the autonomous moving body 10 itself is approximated is mainly described above as an example, the information processing server 20 according to the present embodiment is able to apply a learning result to enable movie recording similar to the simulator model by automatically approximating motion characteristic parameters on the basis of a locus (position, pose) of a camera device, such as a drone, attached to the autonomous moving body 10. Thus, a target of automatic approximation according to the present embodiment may include various kinds of devices attached to the autonomous moving body 10.

Further, as described above, the autonomous moving body 10 according to the present embodiment may be an exoskeleton suit equipped with artificial muscle achieved by an air pressure actuator, or the like. In this case also, motion characteristic parameters for artificial muscle can be automatically approximated from a movement result and a simulation result based on a trajectory of artificial muscle to which the same air pressure command value is given.

<<1.5. Automatic Reapproximation of Motion Characteristic Parameters>>

Next, automatic reapproximation of motion characteristic parameters by the information processing server 20 according to the present embodiment will be described. As described above, with the information processing server 20 according to the present embodiment, it is possible to apply a learning result on the simulator to the autonomous moving body 10 by automatically approximating motion characteristic parameters for the autonomous moving body 10 and the simulator model without converting a control command value each time, as in the technology described in Non Patent Literature 1.

Meanwhile, even in a case where automatic approximation according to the present embodiment has been executed, it is expected that a motion characteristic parameter changes due to, for example, aging deterioration, replacement, or the like of a part included in the autonomous moving body 10. Therefore, the information processing server 20 according to the present embodiment may execute reapproximation of motion characteristic parameters regularly or irregularly even after once executing approximation of the motion characteristic parameters.

FIG. 8 is a diagram for describing reapproximation of motion characteristic parameters according to the present embodiment. In order to apply a learning result on the simulator to the autonomous moving body 10, the information processing server 20 first executes first automatic approximation as illustrated in an upper part of FIG. 8.

At this time, the information processing server 20 generates a control command value by the above-described method and transmits the control command value to the autonomous moving body 10. Further, the information processing server 20 receives a movement log of the movement executed by the autonomous moving body 10 on the basis of the above-described control command value. Here, the above-described movement log includes a control command value, movement environment, a movement result, date and time of acquisition, or the like. In a case of an example illustrated in FIG. 8, the information processing server 20 automatically approximates motion characteristic parameters on the basis of a trajectory $T^R$ included in the movement log and a trajectory $T^S$ obtained as a simulation result, and transmits the learning result after the automatic approximation to the autonomous moving body 10.

After the above-described processing, the autonomous moving body 10 according to the present embodiment may continually or intermittently transmit the above-described movement log to the information processing server 20. At this time, the communication unit 260 passes the received movement log to the data retention unit 230 and causes the data retention unit 230 to accumulate the movement log.

Further, in a case where it is determined from the accumulated movement log that reapproximation needs to be executed, as illustrated in a lower part of FIG. 8, the parameter approximation unit 250 controls the search unit 220 or the similarity calculation unit 240 and executes automatic approximation processing of motion characteristic parameters again. At this time, the parameter approximation unit 250 may execute automatic reapproximation of motion characteristic parameters, on the basis of, for example, passage of predetermined time from date and time of automatic approximation executed last time. In this case, the parameter approximation unit 250 can determine whether or not execution of reapproximation is necessary, on the basis of the date and time of acquisition included in the movement log acquired when the automatic approximation was executed last time.

Further, the parameter approximation unit 250 may detect, for example, that a part included in the autonomous moving body 10 has been replaced, or the like, and determine necessity of reapproximation of motion characteristic parameters. Further, the parameter approximation unit 250 may determine necessity of reapproximation by executing a simulation based on a control command value included in a movement log accumulated in the data retention unit 230, and on the basis that there is a difference between the obtained simulation result and a movement log included in the above-described movement log.

Thus, the information processing server 20 according to the present embodiment can continually update a learning model for the autonomous moving body 10 by dynamically determining whether or not reapproximation of motion characteristic parameters is necessary, and executing reapproximation, if necessary. With the above-described function of the information processing server 20 according to the present embodiment, it is possible to absorb a difference in motion characteristic parameter that may occur due to aging deterioration, part replacement, or the like, and continue to apply the learning result on the simulator to the autonomous moving body 10 continually.

<<1.6. Flow of Movement>>

Next, a flow of movement of the information processing server 20 according to the present embodiment will be described in detail. First, a flow of automatic approximation by the information processing server 20 according to the present embodiment will be described. FIG. 9 is a flowchart illustrating a flow of automatic approximation according to the present embodiment.

With reference to FIG. 9, first, the command value generation unit 210 generates a control command value (S1101).

Next, the communication unit 260 transmits the control command value generated in Step S1101 to the autonomous moving body 10 (S1102).

Next, the communication unit 260 receives, from the autonomous moving body 10, a movement log of the movement executed on the basis of the control command value transmitted in Step S1102 (S1103).

Further, in parallel with steps S1102 and S1103, the search unit 220 acquires a plurality of simulation results for which different motion characteristic parameters have been set on the basis of the control command value generated in Step S1101 (S1104).

Next, the similarity calculation unit 240 calculates similarity between a movement result included in the movement log received in Step S1103 and the plurality of simulation results acquired in Step S1104 (S1105).

Next, the parameter approximation unit 250 executes automatic approximation of the motion characteristic parameters on the basis of the similarity calculated in Step S1105 (S1106).

Next, to the autonomous moving body 10, the communication unit 260 transmits the learning result based on the motion characteristic parameters approximated in Step S1106.

Figure 10:
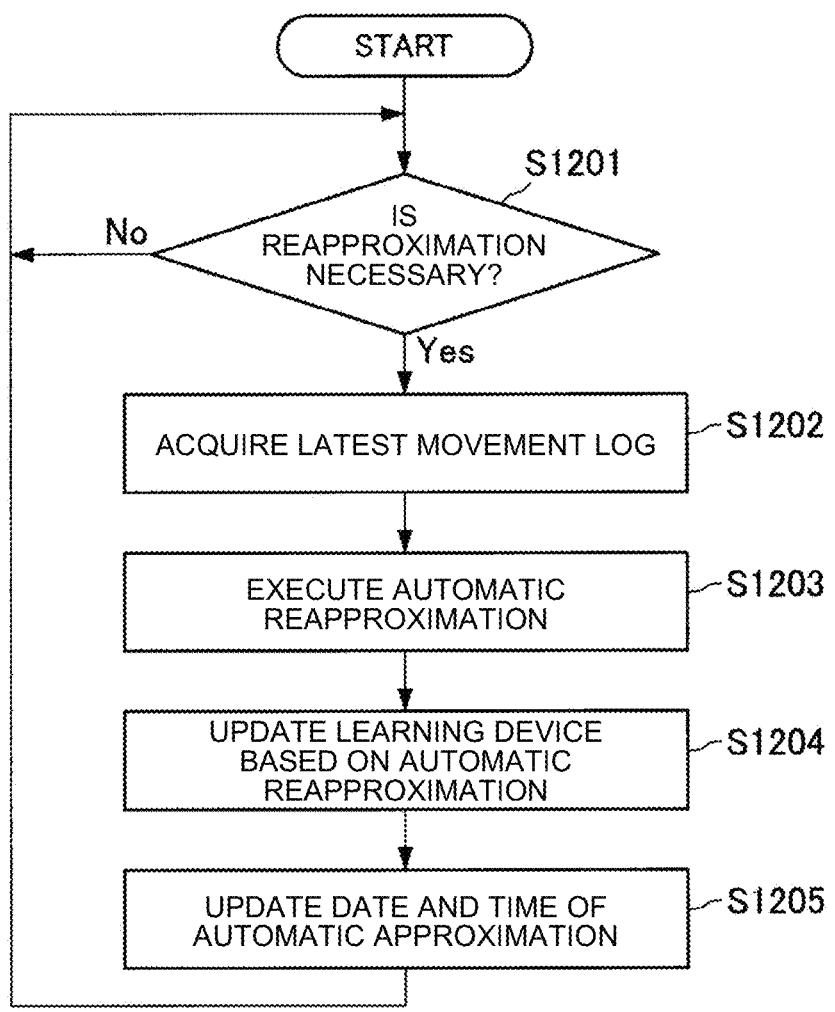
FIG. 10 is a flowchart illustrating a flow of reapproximation of motion characteristic parameters according to the embodiment.

Next, a flow of reapproximation of the motion characteristic parameters according to the present embodiment will be described in detail. FIG. 10 is a flowchart illustrating a flow of reapproximation of motion characteristic parameters according to the present embodiment.

With reference to FIG. 10, first, the parameter approximation unit 250 determines whether or not reapproximation of the motion characteristic parameters is necessary on the basis of the movement log accumulated in the data retention unit 230 (S1201). At this time, the parameter approximation unit 250 may determine whether or not reapproximation is necessary on the basis of passage of time from latest execution of approximation, part replacement, a difference between a movement result and a simulation result, or the like.

Here, in a case where the parameter approximation unit 250 determines that reapproximation of the motion characteristic parameters is necessary (S1201: Yes), next, the parameter approximation unit 250 acquires a latest movement log from the data retention unit 230 (S1202).

Next, the parameter approximation unit 250 executes reapproximation of motion characteristic parameters on the basis of the movement log acquired in Step S1202 (S1203).

Next, the learning result after reapproximation is transmitted to the autonomous moving body 10 by the communication unit 260, and a learning device is updated (S1204).

Next, the parameter approximation unit 250 acquires date and time when the approximation is completed, and updates date and time of automatic approximation retained by the data retention unit 230 (S1205).

<<1.7. Effect>>

Next, an effect of automatic approximation of motion characteristic parameters according to the present embodiment will be described with reference to FIGS. 11 and 12. Here, control command values (target velocity and target acceleration), which are the same as control command values for the autonomous moving body 10 were given to a simulator model, and obtained trajectories were compared.

Figure 11:
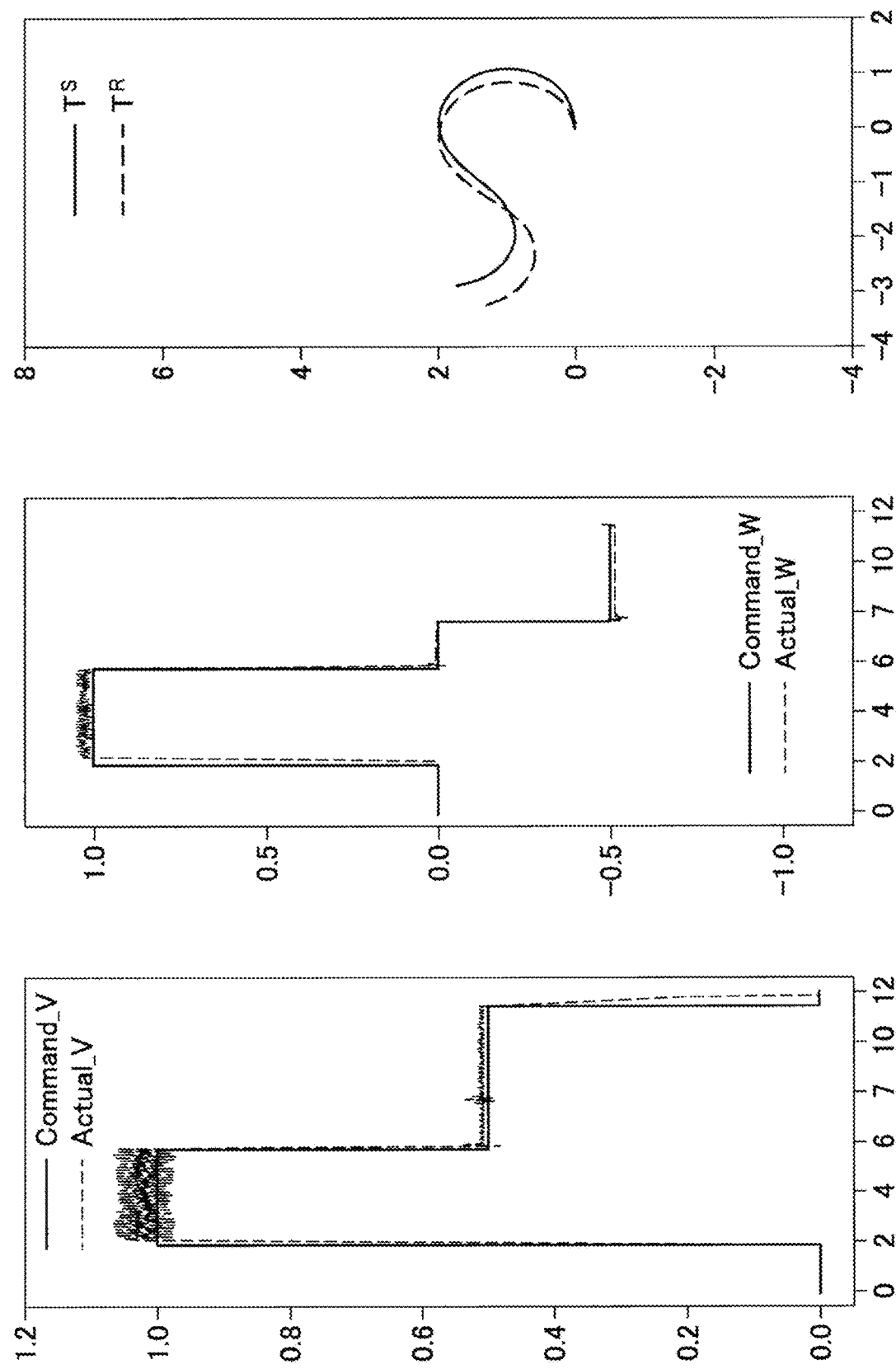
FIG. 11 is a diagram for describing an effect of automatic approximation of motion characteristic parameters according to the embodiment.

FIG. 11 illustrates a measurement result before performing automatic approximation according to the present embodiment. FIG. 11 illustrates, in order from the left, actual velocity (Actual_V) of a simulator model with respect to target velocity (Command_V), actual acceleration (Actual_W) of the simulator model with respect to target acceleration (Command_W), a trajectory $T^R$ of the autonomous moving body 10 and a trajectory $T^S$ of the simulator model.

Here, focusing on the trajectory $T^R$ of the autonomous moving body 10 and the trajectory $T^S$ of the simulator model, it is shown that there is large deviation between the trajectory $T^R$ and the trajectory $T^S$ before performing automatic approximation of motion characteristic parameters according to the present embodiment.

Figure 12:
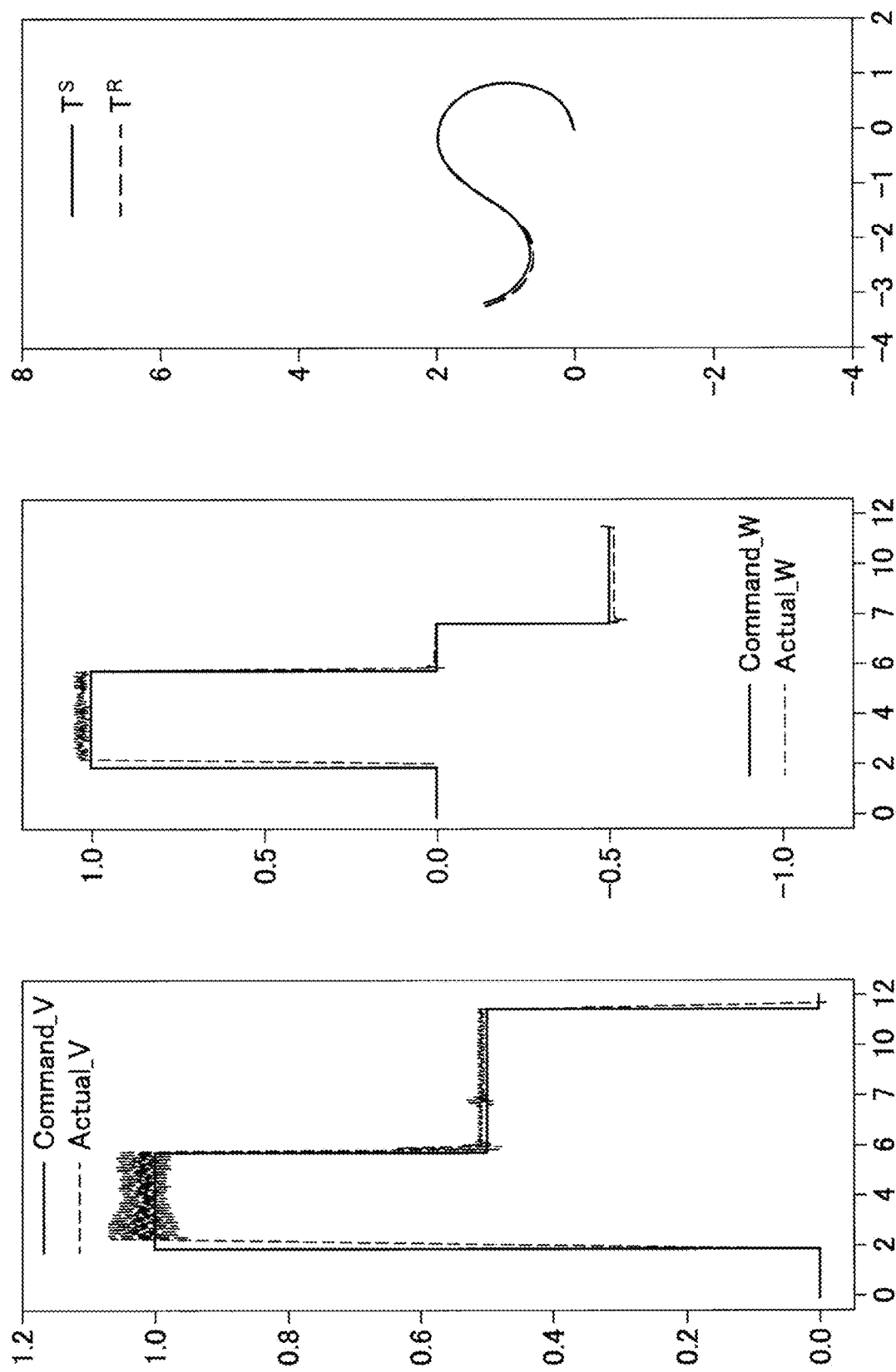
FIG. 12 is a diagram for describing an effect of automatic approximation of motion characteristic parameters according to the embodiment according to the embodiment.

Meanwhile, FIG. 12 illustrates a measurement result after performing automatic approximation according to the present embodiment. Note that, acceleration, angular acceleration, a PID control parameter, and a delay control parameter were used as motion characteristic parameters to be approximated. Further, as in a case of FIG. 11, FIG. 12 also illustrates, in order from the left, actual velocity (Actual_V) of the simulator model with respect to target velocity (Command_V), actual acceleration (Actual_W) of the simulator model with respect to target acceleration (Command_W), a trajectory $T^R$ of the autonomous moving body 10 and a trajectory $T^S$ of the simulator model.

With reference to FIG. 12, after the automatic approximation according to the present embodiment, follow-up characteristics with respect to the target velocity and the target angular velocity are slightly changed compared to before approximation in FIG. 11, and as a result, it is shown that the trajectory $T^S$ of the simulator model has changed greatly and is substantially consistent with the trajectory $T^R$ of the autonomous moving body 10.

An effect of automatic approximation by the information processing server 20 according to the present embodiment has been described above with reference to FIGS. 11 and 12. Thus, with the information processing server 20 according to the present embodiment, it is possible to automatically generate a simulator model that has a motion characteristic parameter similar to a motion characteristic parameter of the autonomous moving body 10, and to apply the learning result on the simulator model to the autonomous moving body 10.

2. Hardware Configuration Example

Figure 13:
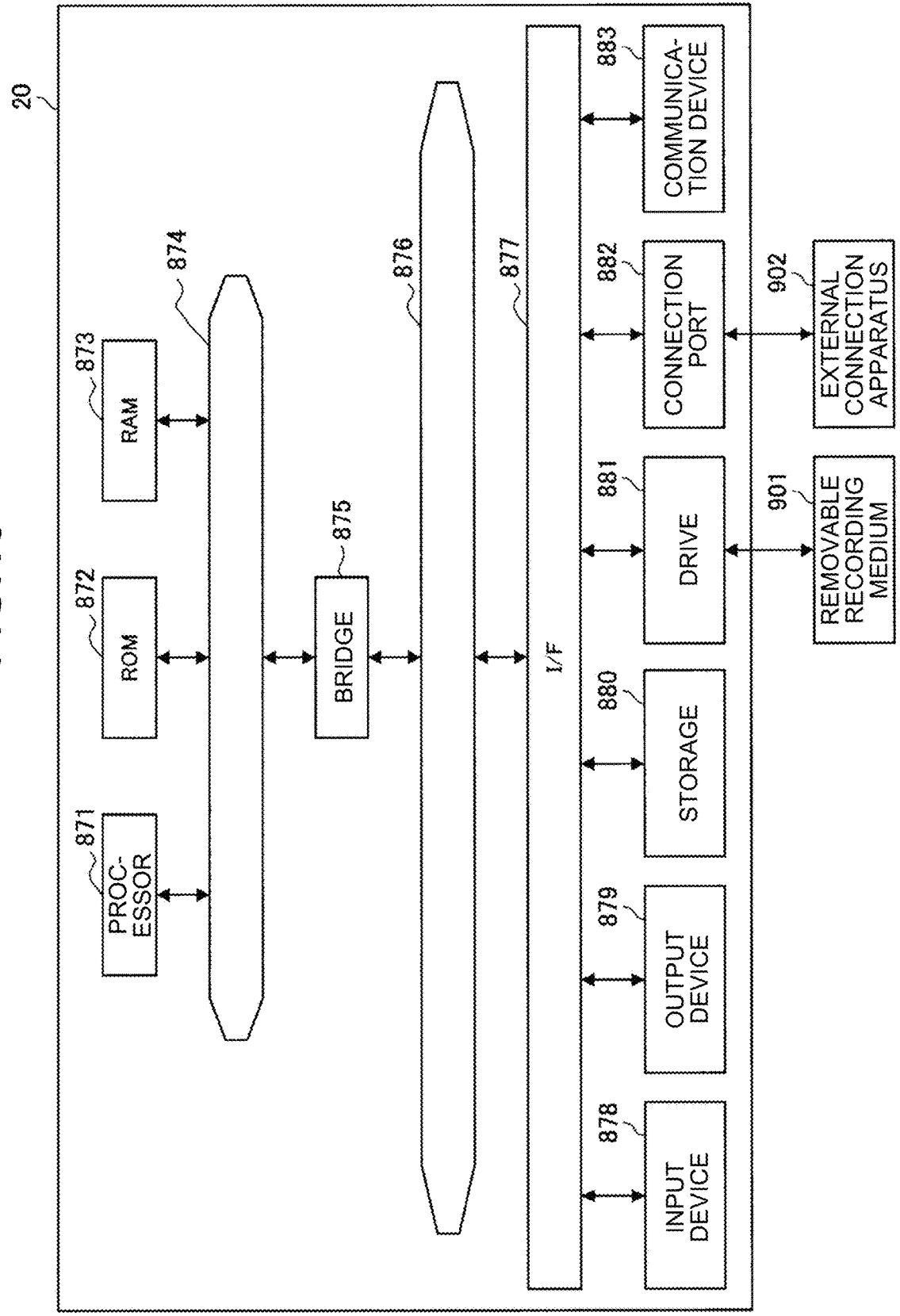
FIG. 13 is a diagram illustrating a hardware configuration example of an information processing server according to an embodiment of the present disclosure.

Next, a hardware configuration example of the information processing server 20 according to an embodiment of the present disclosure will be described. FIG. 13 is a block diagram illustrating a hardware configuration example of the information processing server 20 according to an embodiment of the present disclosure. With reference to FIG. 13, the information processing server 20 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. Further, components other than the components illustrated here may be further included.

(Processor 871)

The processor 871 functions as, for example, an arithmetic processing device or a control device, and controls an entire or a part of operation of each component on the basis of various programs recorded in the ROM 872, the RAM 873, the storage 880, or a removable recording medium 901.

(ROM 872, RAM 873)

The ROM 872 is a means to store a program read by the processor 871, data used for calculations, or the like. The RAM 873 temporarily or permanently stores, for example, the program read by the processor 871, various parameters that change as appropriate when the program is executed, or the like.

(Host Bus 874, Bridge 875, External Bus 876, Interface 877)

The processor 871, the ROM 872, and the RAM 873 are mutually connected via, for example, the host bus 874 capable of high-speed data transmission. Meanwhile, the host bus 874 is connected to, for example, the external bus 876 having a relatively low data transmission speed via the bridge 875. Further, the external bus 876 is connected to various kinds of components via the interface 877.

(Input Device 878)

As the input device 878, for example, a mouse, a keyboard, a touch panel, a button, a switch, a lever, or the like, is used. Moreover, as the input device 878, a remote controller (hereinafter, remote controller) capable of transmitting a control signal by using an infrared ray or another radio wave may be used. Further, the input device 878 includes a voice input device such as a microphone.

(Output Device 879)

The output device 879 is, for example, a display device such as a cathode-ray tube (CRT), LCD, or organic EL, an audio output device such as a speaker or a headphone, a printer, a mobile phone, or a facsimile, which is a device capable of visually or audibly notifying a user of acquired information. Further, the output device 879 according to the present disclosure includes various kinds of vibration devices capable of outputting a tactile stimulus.

(Storage 880)

The storage 880 is a device for storing various data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device to read information recorded in the removable recording medium 901 such as a magnetic disk, an optical disc, a magneto-optical disk, or a semiconductor memory, or to write information into the removable recording medium 901.

(Removable Recording Medium 901)

The removable recording medium 901 is, for example, a DVD medium, a Blu-ray (registered trademark) medium, an HD DVD medium, or various semiconductor storage media. Needless to say, the removable recording medium 901 may be, for example, an IC card on which a contactless IC chip is mounted, or an electronic apparatus.

(Connection Port 882)

The connection port 882 is, for example, a port to connect an external connection apparatus 902, such as a universal serial bus (USB) port, an IEEE1394 port, a small computer system interface (SCSI), an RS-232C port, or an optical audio terminal.

(External Connection Apparatus 902)

The external connection apparatus 902 is, for example, a printer, a portable music player, a digital camera, a digital video camera, or an IC recorder.

(Communication Device 883)

The communication device 883 is a communication device to connect to a network, and is, for example, a communication card for a wired or wireless LAN, Bluetooth (registered trademark), or a wireless USB (WUSB); a router for optical communication, a router for asymmetric digital subscriber line (ADSL), or a modem used for various communication.

3. Summary

As described above, the information processing server 20 according to an embodiment of the present disclosure includes the communication unit 260 that receives a movement result of the autonomous moving body 10 based on a control command value, and the parameter approximation unit 250 that approximates a motion characteristic parameter of a simulator model for a movement simulation of the autonomous moving body 10 on the basis of the movement result of the autonomous moving body 10. Further, one feature of the parameter approximation unit 250 according to an embodiment of the present disclosure is to approximate motion characteristic parameters, on the basis of similarity between a plurality of simulation results acquired on the basis of different motion characteristic parameters in a movement simulation based on a control command value, and a movement result of the autonomous moving body 10. With this configuration, it is possible to more easily and effectively absorb a difference in motion characteristic between a simulator model and a real robot.

Although the preferred embodiment of the present disclosure has been described above in detail with reference to the appended drawings, a technical scope of the present disclosure is not limited to this example. It is obvious that a person with an ordinary skill in a technological field of the present disclosure could conceive of various alterations or corrections within the scope of the technical ideas described in the appended claims, and it should be understood that such alterations or corrections will naturally belong to the technical scope of the present disclosure.

Further, the effects described in this specification are just explanatory or exemplary effects, and are not limitative. That is, with or in the place of the above-described effects, the technology according to the present disclosure may achieve any other effects that are obvious, from description of this specification, for a person skilled in the art.

Further, each step of processing by the information processing server 20 in this specification does not necessarily have to be processed in time series according to an order described as a flowchart. For example, each step related to the processing by the information processing server 20 may be performed in an order different from the order described as the flowchart, or may be performed in parallel.

Note that the following configurations also belong to the technical scope of the present disclosure.

(1)

An information processing device comprising:

a communication unit that receives a movement result of an autonomous moving body based on a control command value; and a parameter approximation unit that approximates a motion characteristic parameter of a simulator model for a movement simulation of the autonomous moving body on a basis of the movement result of the autonomous moving body, wherein the parameter approximation unit approximates the motion characteristic parameter on a basis of similarity between a plurality of simulation results acquired on a basis of the different motion characteristic parameters in the movement simulation based on the control command value, and the movement result of the autonomous moving body.

(2)

The information processing device according to (1), wherein the communication unit transmits, to the autonomous moving body, a learning result based on the motion characteristic parameter approximated by the parameter approximation unit.

(3)

The information processing device according to (1) or (2), wherein the parameter approximation unit approximates the motion characteristic parameter on a basis of the simulation result having a highest similarity to the movement result of the autonomous moving body, among the plurality of simulation results acquired on the basis of the different motion characteristic parameters.

(4)

The information processing device according to any one of (1) to (3), wherein the motion characteristic parameter includes a follow-up control parameter.

(5)

The information processing device according to (4), wherein the follow-up control parameter includes at least one of a PID control parameter or a differential drive control parameter.

(6)

The information processing device according to any one of (1) to (5), wherein the motion characteristic parameter includes at least one of velocity, angular velocity, a rotation angle of a motor, torque, or current.

(7)

The information processing device according to any one of (1) to (6), wherein the movement result of the autonomous moving body and the simulation result include at least one of a trajectory based on the control command value, gyro transition, relative position transition, relative pose transition, velocity transition, angular velocity transition, or rotation angle transition of a motor.

(8)

The information processing device according to any one of (1) to (7), wherein the control command value is a command value for movement involving a velocity change or angular velocity change.

(9)

The information processing device according to any one of (1) to (8), wherein the control command value includes a plurality of combinations of command values for control factors.

(10)

The information processing device according to any one of (1) to (9), wherein the plurality of simulation results based on the different motion characteristic parameters are acquired by using at least one search method from a random search, a grid search, genetic algorithm, or a hill climbing search.

(11)

The information processing device according to any one of (1) to (10), wherein the communication unit continually or intermittently receives a movement log of the autonomous moving body based on the control command value, and the parameter approximation unit reapproximates the motion characteristic parameter on a basis of the movement log.

(12)

The information processing device according to (11), wherein the movement log includes at least one of the movement result or date and time of acquisition.

(13)

The information processing device according to (11) or (12), wherein the parameter approximation unit reapproximates the motion characteristic parameter on a basis of elapsed time from date and time of execution of automatic approximation last time.

(14)

The information processing device according to any one of (11) to (13), wherein the parameter approximation unit reapproximates the motion characteristic parameter on a basis of a difference between the movement result and the simulation result.

(15)

The information processing device according to any one of (1) to (14), wherein the communication unit transmits the generated control command value to the autonomous moving body.

(16)

The information processing device according to any one of (1) to (15), further comprising a command value generation unit that generates the control command value.

(17)

The information processing device according to any one of (1) to (16), further comprising a search unit that sets the different motion characteristic parameters on a basis of the control command value and acquires the plurality of the simulation results.

(18)

The information processing device according to any one of (1) to (17), further comprising a similarity calculation unit that calculates similarity between the movement result of the autonomous moving body on a basis of the control command value and the simulation result.

(19)

The information processing device according to any one of (1) to (18), wherein the autonomous moving body includes at least one of a mobile robot or an arm-type robot.

(20)

An information processing method comprising, by a processor:

receiving a movement result of an autonomous moving body based on a control command value; and approximating a motion characteristic parameter of a simulator model for a movement simulation of the autonomous moving body on a basis of the movement result of the autonomous moving body, wherein the approximating further includes approximating the motion characteristic parameter on a basis of similarity between a plurality of simulation results acquired on a basis of the different motion characteristic parameters in the movement simulation based on the control command value, and the movement result of the autonomous moving body.

REFERENCE SIGNS LIST

10 AUTONOMOUS MOVING BODY
110 MOVEMENT EXECUTION UNIT
20 INFORMATION PROCESSING SERVER
210 COMMAND VALUE GENERATION UNIT

220 SEARCH UNIT
230 DATA RETENTION UNIT
240 SIMILARITY CALCULATION UNIT
250 PARAMETER APPROXIMATION UNIT
260 COMMUNICATION UNIT

The invention claimed is:

1. An information processing device comprising:
circuitry configured to
transmit a control command value to an autonomous moving body;
receive a movement result of the autonomous moving body based on the control command value and continually or intermittently receive a movement log of the autonomous moving bud based on the control command value; and
approximate a motion characteristic parameter of a simulator model for a movement simulation of the autonomous moving body on a basis of the movement result of the autonomous moving body and reapproximate the motion characteristic parameter on a basis of the movement log and on a basis of elapsed time from date and time of execution of automatic approximation last time,
wherein the motion characteristic parameter is approximated on a basis of similarity between a plurality of simulation results acquired on a basis of the different motion characteristic parameters in the movement simulation based on the control command value, and the movement result of the autonomous moving body.

2. The information processing device according to claim 1, the circuitry being further configured to transmit, to the autonomous moving body, a learning result based on the approximated motion characteristic parameter.

3. The information processing device according to claim 1,
the circuitry being further configured to
approximate the motion characteristic parameter on a basis of the simulation result having a highest similarity to the movement result of the autonomous moving body, among the plurality of simulation results acquired on the basis of the different motion characteristic parameters.

4. The information processing device according to claim 1,
wherein the motion characteristic parameter includes a follow-up control parameter.

5. The information processing device according to claim 4,
wherein the follow-up control parameter includes at least one of a PID control parameter or a differential drive control parameter.

6. The information processing device according to claim 1,
wherein the motion characteristic parameter includes at least one of velocity, angular velocity, a rotation angle of a motor, torque, or current.

7. The information processing device according to claim 1,
wherein the movement result of the autonomous moving body and the simulation result include at least one of a trajectory based on the control command value, gyro transition, relative position transition, relative pose transition, velocity transition, angular velocity transition, or rotation angle transition of a motor.

8. The information processing device according to claim 1,
wherein the control command value is a command value for movement involving a velocity change or angular velocity change.

9. The information processing device according to claim 1,
wherein the control command value includes a plurality of combinations of command values for control factors.

10. The information processing device according to claim 1,
wherein the plurality of simulation results based on the different motion characteristic parameters are acquired by using at least one search method from a random search, a grid search, genetic algorithm, or a hill climbing search.

11. The information processing device according to claim 1,
wherein the movement log includes at least one of the movement result or date and time of acquisition.

12. The information processing device according to claim 1,
the circuitry being further configured to
reapproximate the motion characteristic parameter on a basis of a difference between the movement result and the simulation result.

13. The information processing device according to claim 1,
the circuitry being further configured to
generate the control command value.

14. The information processing device according to claim 1,
the circuitry being further configured to
the different motion characteristic parameters on a basis of the control command value and acquires the plurality of the simulation results.

15. The information processing device according to claim 1, further comprising
the circuitry being further configured to
calculate similarity between the movement result of the autonomous moving body on a basis of the control command value and the simulation result.

16. The information processing device according to claim 1,
wherein the autonomous moving body includes at least one of a mobile robot or an arm-type robot.

17. An information processing method comprising, by a processor:
transmit a control command value to an autonomous moving body;
receiving a movement result of the autonomous moving body based on the control command value and continually or inters intermittently receive a movement log of the autonomous moving body based on the control command value; and
approximating a motion characteristic parameter of a simulator model for a movement simulation of the autonomous moving body on a basis of the movement result of the autonomous moving body and reapproximate the motion characteristic parameter on a basis of the movement log and on a basis of elapsed time from date and time of execution of automatic approximation last time,
wherein the approximating further includes approximating the motion characteristic parameter on a basis of similarity between a plurality of simulation results acquired on a basis of the different motion characteristic parameters in the movement simulation based on the control command value, and the movement result of
the autonomous moving body.

\* \* \* \* \*